July 17, 1962
D. I. PACKARD
3,044,420
LOAD RESTRAINING DEVICE
Filed May 9, 1958
3 Sheets-Sheet 1
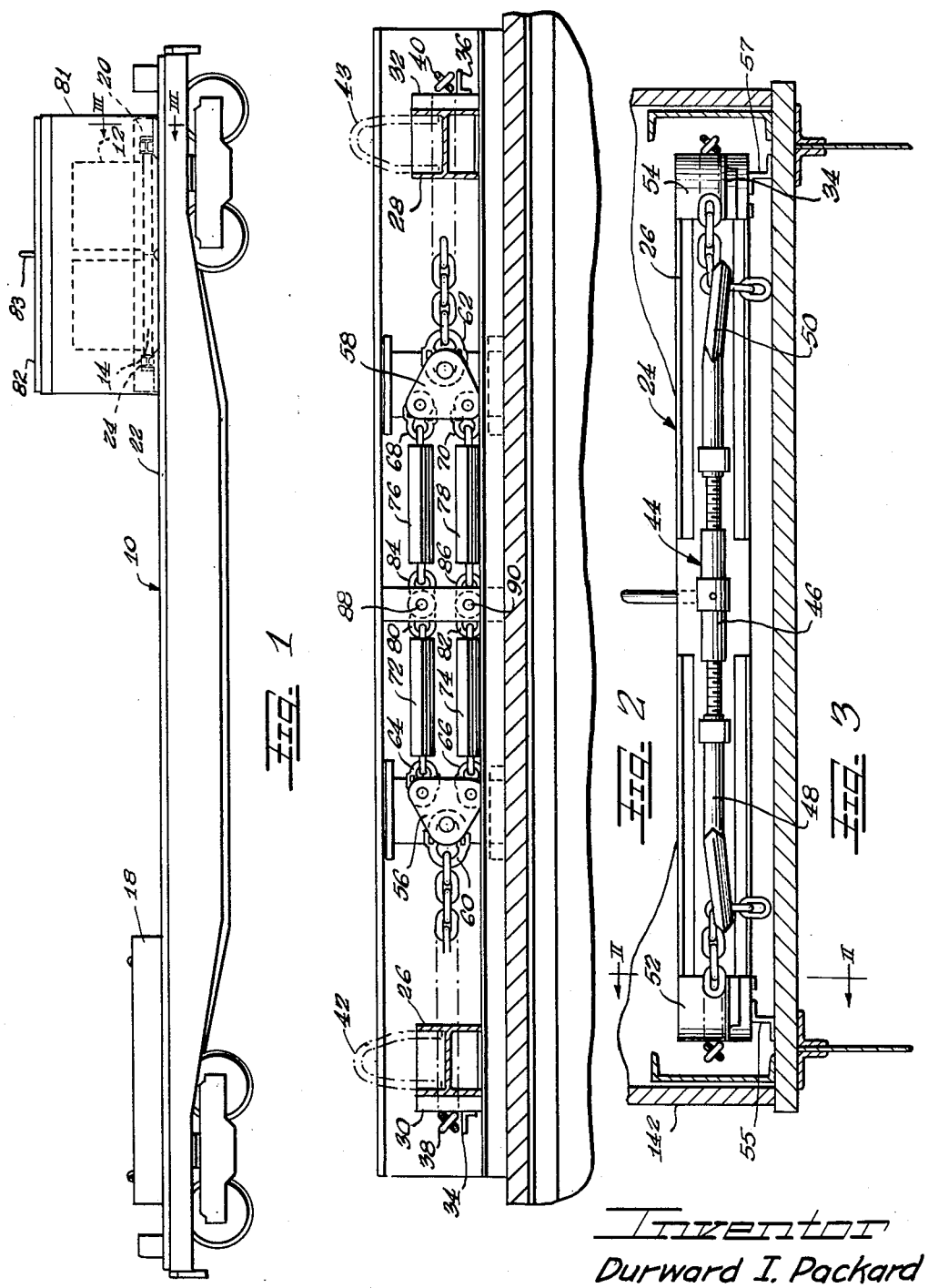
Inventor
Durward I. Packard July 17, 1962 D. I. PACKARD 3,044,420
LOAD RESTRAINING DEVICE
Filed May 9, 1958 3 Sheets-Sheet 2
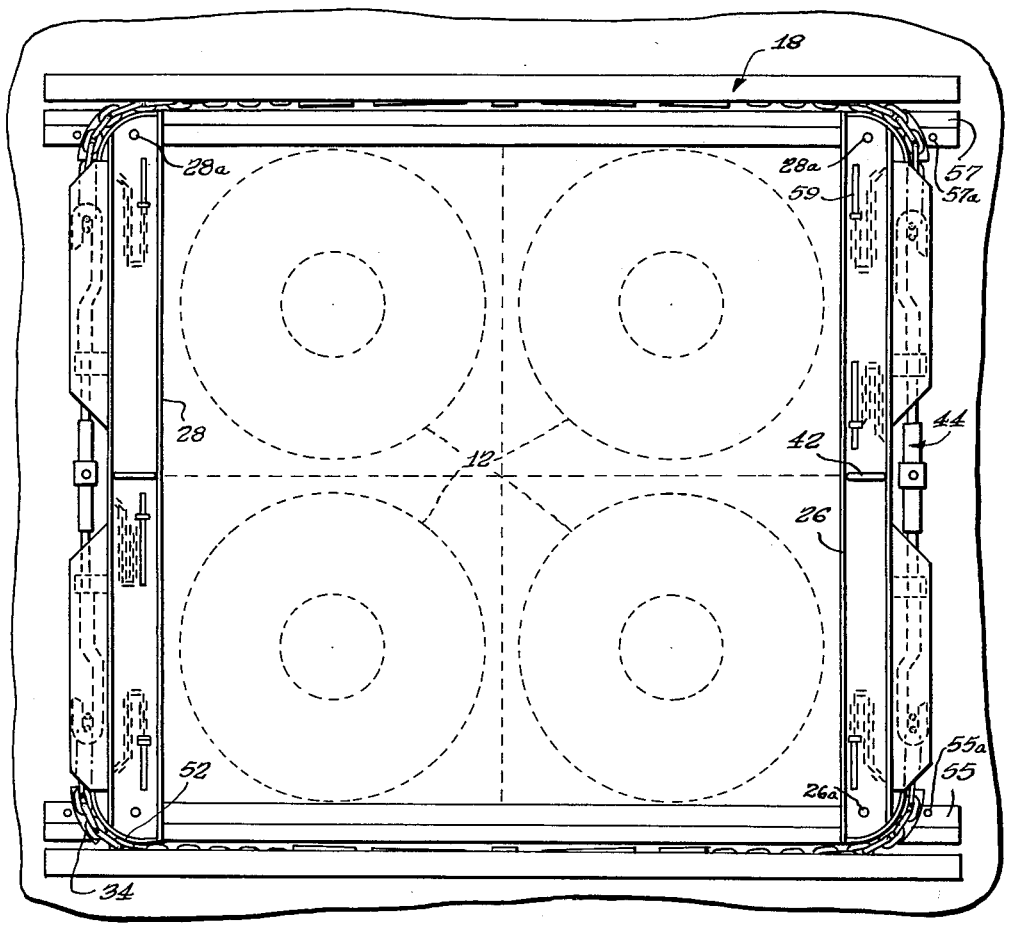
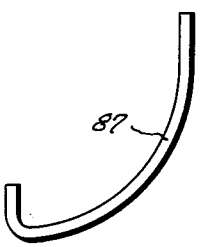
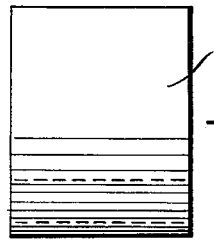
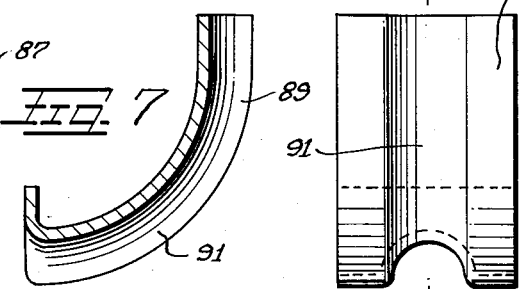
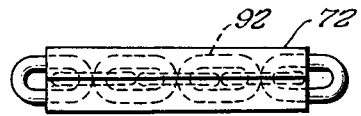
Inventor
Durward I. Packard

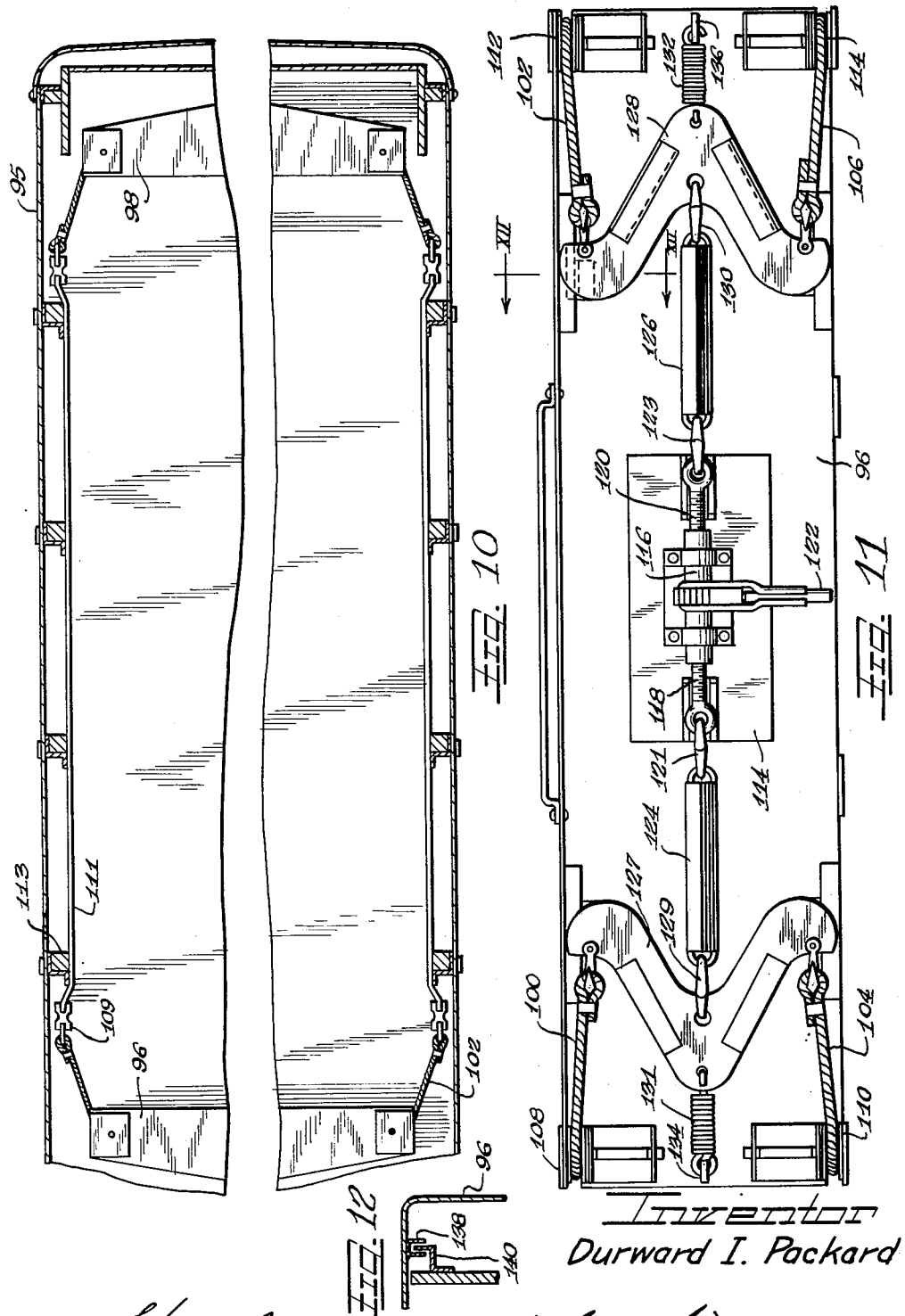

United States Patent Office 3,044,420
Patented July 17, 1962

3,044,420
LOAD RESTRAINING DEVICE
Durward I. Packard, Kenilworth, Ill., assignor to Brandon Equipment Company, Inc., Chicago, Ill., a corporation of Illinois
Filed May 9, 1958, Ser. No. 734,271
4 Claims. (Cl. 105—369)

This invention relates to a load restraining device and more particularly to a device adapted for use on a railroad car or the like in order to restrain a load against sudden impact shocks during acceleration or deceleration of the car.

Heretofore a number of devices have been available for the protection of lading in a railroad freight car. These include wooden blocking and bulkheads, portable steel bulkheads, special cars with belt rails arranged for the installation of cross bars, gates or bulkheads attached to the interior of box cars which are swung or lowered into position, and retarder plates used with steel strapping around the load. However, none of these devices have prevented damage to certain loads of heavy material which require careful handling. Tin plate, in flat sheets or coils, in particular, can be ruined in transit by abrasion, denting, moisture or other factors, and rigid, non-resilient holding means, or holding means such as have a slot and key arrangement for variable positioning in accordance with the size of the load have proved unsatisfactory because they are subject to the full impact of sudden shocks resulting from acceleration or deceleration of the car. Thus where any space is left between the load and the holding means, the free movement of the load has generally produced a rapid breakdown of the equipment.

The invention overcomes these difficulties by providing a pair of bulkheads or structural elements of heavy steel or the like which are held under tension by alloy chain which will withstand the forces inherent in the shipping of tin plate or coils so as to clamp the load tightly at both ends, thus preventing the damage which results when rubbing action takes place between packages, as well as sliding movement of the load prior to engagement with the restraining means. Fastening means are disposed on each side of the load and intermediate the bulkheads, and adjustment of the tension is afforded by means of a turnbuckle arrangement forming a part of an adjustable linkage means which includes the chains. Impact loads from acceleration or deceleration and the like are taken up by shock absorber means, which in one embodiment of the load restraining device includes a predetermined length of chain foreshortened axially sufficiently that resilient material in the interstices between the links will afford damping action in response to compression forces produced as the exposed ends of the chain are pulled in opposite directions cooperatively in the load restraining structure. Equalizer means are provided to balance the stress where more than one linkage means is used, and each of the bulkheads is provided with shoes, quandrants, pulleys or the like for the chains of the linkage means. The restraining device is adapted for use in flat cars, box cars or gondolas in accordance with the several embodiments provided therefore.

In the box car device, the chains are permanently attached to steel straps welded to the vertical structural members in the side wall of the car. A pair of chains may be used at each end of the bulkheads or restraining members, one above the load and the other below the level of the pallet platform. Since the box car device is designed for lift truck loading, the pallets are pushed firmly against the endmost restraining members initially so that the equalizers, which are connected by the turnbuckle on the inner beam of the device, may be joined by a chain at the endmost beams and the turnbuckle and adjustable means for connecting the chains thereto. The beams may be moved to the end of the car upon return of the car after unloading, and fastening means may be slipped into loops on the beams during transit.

The flat car device provides spaced sets of parallel channels, bolted to the side sills of the car, one set being preferably disposed at each end of the car to permit shipment of two groups of pallets although three groups of pallets may be shipped by the addition of a central set. A shock absorber assembly is anchored to each side channel, the channels also serving as a housing to retain the shock absorber assemblies in position. In practice, each assembly may consist of a pair of cushion chain sections, as described, linked to an equalizer; although a single larger cushion chain section of proper capacity may be used without an equalizer means. Chains of alloy or the like are linked to each shock absorber assembly and passed around the rounded shoe of the restraining beam to connect with hook means on the ends of the turnbuckles of the invention, the turnbuckles being disposed at the center of the restraining beams for ready access. Since flat car loading is accomplished by cranes, the end beams as well as the inner beams have turnbuckles, each group of pallets being clamped solidly as a unit between the cushioned restraining beams. To protect coil wrappings from weather, a cover may be mounted on the outside of each of the sets of channels and held cooperatively thereby during transit, these covers being sufficiently long to protect each group of palletized coils and their restraining beams and having lift means for engagement with a crane hook or the like for removal purposes. The restraining beams ride on permanent Z bars on the car floor, and on return trips the restraining beams may be held by pins inserted therethrough, the turnbuckles serving to take up slack in the chains and hold the entire assembly in position.

An object of the invention therefore is to provide a load restraining device as described in which a pair of bulkheads positioned on opposite sides of the loads are clamped securely against the load by linkage means whose tension is adjustable to a desired extent so as to prevent any slack between the bulkheads and the load such as has caused damage heretofore.

Another object of the invention is to provide a load restraining device as described in which the linkage means are provided with turnbuckle means to permit manual adjustment of the tension against the load to a desired extent.

Another objects of the invention is to provide a load restraining device in which the linkage means are provided with shock absorber means which are adapted to take up the initial impact from movement of the load during acceleration or deceleration of the train so that damage to the load is prevented.

Another object of the invention is to provide a load restraining device as described in which the shock absorber means include a chain having resilient material within its inner links and adapted to form a part of the linkage means, the chain being foreshortened sufficiently so that the shock absorber will elongate to a predetermined extent without danger of overloading or snapping.

Another object of the invention is to provide shock absorber means which are utilized in multiple units with the linkage means of the invention.

Another object of the invention is to provide means for fastening the linkage means for the retraining device upon a flatcar or the like, in the form of retaining structure secured in spaced parallel relationship along the longitudinal axis of the flatcar, the linkage means being secured to the channel members intermediate the bulkheads as described.

Yet another object of the invention is to provide a load restraining device in which a plurality of linkage or cable means is used with each of the bulkheads, and equalizer means are provided to overcome the extra strain which might otherwise result from tensioning one of the cables to a greater extent than another.

Yet another object of the invention is to provide a load restraining device as described in which the bulkheads are adapted to contact a pallet or other load supporting member, and cover means are removably positioned over the load and the pallets and held cooperatively by the channel members hereinabove set forth.

Other objects and advantages of the invention will become apparent as the description proceeds in accordance with the drawings in which:

FIGURE 1 is a side elevational view of a flatcar carrying load restraining means according to the present invention;

FIGURE 2 is an enlarged side sectional view of the load restraining means of FIGURE 1;

FIGURE 3 is a front elevational view of the load restraining means shown in FIGURES 1 and 2;

FIGURE 4 is a top plan view of the load restraining means shown in FIGURES 1 through 3;

FIGURE 5 is an enlarged fragmentary detail view of shoe means for the corner portions of the load restraining bulkheads of the invention;

FIGURE 6 is a side elevation view of the shoe shown in FIGURE 5;

FIGURE 7 is a detailed view of another form of the shoe of the invention;

FIGURE 8 is a plan view of the shoe or guide of FIGURE 7;

FIGURE 9 is a detail view of a shock absorber which may be used with the linkage means of the invention;

FIGURE 10 is a top plan view, partly broken away, of the load restraining means of the invention as shown in an embodiment for use with a boxcar or freight car;

FIGURE 11 is a front elevational view of the embodiment shown in FIGURE 10, in slightly enlarged form; and FIGURE 12 is an enlarged fragmentary sectional view of a portion of a detailed guide portion of the embodiment of FIGURES 10 and 11.

Referring now to FIGURE 1, a flatcar 10 is shown for carrying a load 12, which in the example shown is comprised of a plurality of tin mill coils disposed upon pallets 14 which may be of conventional construction. At opposite ends of the car, pairs of channels 18 and 20 are mounted on the surface 22 of the flatcar 10 and are adapted to have fixedly secured thereto load restraining means 24 according to the invention as seen more particularly in FIGURES 2-4.

The load restraining means 24 includes a pair of bulkheads or abutment walls 26 and 28 adapted to be disposed oppositely and in register with one another against the pallets 14. Each of the bulkheads 26 and 28, in the form of the invention shown, is provided along the back edges 30 and 32 thereof with angle brackets 34 and 36 respectively upon which ride linkage means 38 and 40, in the form of a chain or other flexible tensioning means as shown. The bulkheads may be provided with lifting handles 42 and 43, and in accordance with the invention, the chains 38 and 40 extend from the backs of each of the bulkheads and along each side of the pallets 14 toward the bulkhead opposite thereto. In the present embodiment, adjustment of the tension in the chains 38 and 40 is provided by turnbuckle means 44 disposed along the back of each of the bulkheads and comprising a turnbuckle barrel 46 carrying hooks 48 and 50 at opposite ends thereof for engagement with each section of chain 40. A similar arrangement is utilized at the back of each of the bulkheads and it will be understood that the tension of the bulkheads and the linkage means 38 and 40 against the pallets 14 may be varied to any desired degree of tightness in accordance with the invention, to assure a firm engagement of the bulkheads with the load. The bulkheads 26 and 28 may be disposed on Z-shaped supports 55 and 57 to reduce friction, and each of the bulkheads has at its opposite corners thereof a guide means or shoe such as the shoes 52 and 54 as hereinafter set forth, for affording easy movement of the load restraining linkage means 38 and 40 around the said corners. As seen in FIGURE 2, the chains 38 and 40 are each pivotally engaged with triangular equalizer plates 56 and 58 by fastening elements 60 and 62. The equalizer plates 56 and 58 carry fastening means 64 and 66 and 68 and 70, respectively for engagement with resilient shock absorber means 72 and 74 and 76 and 78 as hereinafter set forth; the shock absorber means 72–78 thus forming a part of linkage means 38 and 40. At their inner ends, the shock absorbers 72–78 are shown as being secured by the fastening elements 80, 82, 84 and 86 to a central portion of one of the channels of the pair of channels 18 as indicated at 88 and 90. The other channel 91 of the pair of channels 18 is formed with a similar fastening means, for corresponding shock absorber elements. As seen in FIGURE 4, the supports 55 and 57 are provided with apertures 55a and 57a at each end adapted to be disposed in register with corresponding apertures 26a and 28a on the beams 26 and 28, and to receive pins 59 therein for holding the beams during a return trip, the turnbuckle then taking up slack in the chains.

Referring now to FIGURE 9, it will be seen that the shock absorbers, such as the unit 72, each comprise a length of chain 92 similar to chains 38 and 40, which is foreshortened or contracted along its length sufficiently so that when impact tension is imposed upon the linkage means 38 and 40, the shock absorber means such as the unit 72 can elongate to a predetermined extent which is in accordance with the limit fixed by the maximum length of the chain 92 a suitable resilient material between the links being placed under compression at such time. Accordingly, a resilient snubbing action is afforded which cushions the load against impact force in transit.

Referring again to FIGURE 1, a cover 81 is provided for use with the flatcar 10, to protect the load against rain or other adverse weather conditions. Preferably, the cover 81 is positioned on either side of the pair of channels 20 and restrained thereby against movement relative to the surface 22. A lifting means 83 is provided at the top of the cover, and upon a channel portion 82 thereof, which is welded thereto and reinforced as will be understood by those skilled in the art.

Referring now to FIGURES 10 and 11, a second form of the invention is shown wherein a load restraining device is adapted for use in a boxcar or the like 95. A pair of bulkheads 96 and 98 are disposed in register opposite one another along the longitudinal length of the boxcar 95, at the desired location of a load to be received therebetween. The bulkheads 96 and 98 each have upper and lower cables such as the cables 100 and 102 and 104 and 106 or other suitable flexible and adjustable elements as seen with respect to the bulkhead 96, which are engaged with shock absorber means disposed along the backs thereof, as hereinafter set forth, and are secured by means such as the retainers 109 to straps 111 of metal or other suitably strong material which are fastened to the uprights 113 of the boxcar. Other means of fastening the ends of the flexible elements to the car walls and intermediate the bulkheads may be utilized, as will be readily understood, and these elements are guided from the backs of the bulkheads by pulleys such as the pulleys 108, 110, 112 and 114 which are shown as journalled in the bulkhead 96 although shoes, quadrants or the like may be used. The back 114 of the bulkhead 96 is provided with a turnbuckle 116 having screws 118 and 120 threadedly received therein for adjustment by means of a lever 122, each of the screws 118 and 120 having an eyelet receiving a link 121 and 123 respectively to secure shock absorbers 124 and 126, it being understood that similar means are provided for the bulkhead 98.

In order to compensate for differences in tension between the upper and lower cables which might otherwise place most of the impact strain on one of the sets thereof, the other ends of the shock absorbers 124 and 126 engage equalizer plates 127 and 128 by means of links 129 and 130. The plates 127 and 128 retain springs 131 and 132, respectively, which are secured to the channel or bulkhead 96 by bracket means 134 and 136, the springs being in register with the shock absorbers 124 and 126. The flexible elements 100—106 engage the upper and lower extremeties of the brackets in pivotal relationship thereto as shown, so that a balancing action is afforded which compensates for unequal load on these elements.

As seen with respect to FIGURE 12, each of the equalizer plates 127 and 128 has its upper and lower ends slidably engaged within a channel such as the channel 138, by means of a suitable guide element 140 welded or otherwise suitably secured thereupon. Thus the load restraining means will be maintained in proper alignment during the most severe impact.

Various forms of the shoes for guiding the linkage means smoothly around the bulkhead corners may be provided as seen in FIGURES 5 through 8. Thus FIGURES 5 and 6 disclose an arcuate plate 87 which may be mounted upon the bulkheads as seen, for example, at 52 in FIGURE 4. FIGURES 7 and 8 disclose another type of guide shoe 89, which is grooved at 91 so as to restrain the chains 38 and 40 from slipping beyond the boundaries of the shoe, and reference is again made to the pulleys 108—114, although the sleeve or guide structure of FIGURES 5-8 is the preferred form of the invention.

There has thus been provided a load restraining device for use in transporting heavy materials or the like, wherein a pair of bulkheads or retaining member may be brought into firm engagement with the load by tension or linkage means which prevent any possibility of an initial slack such as causes damage and breaking in conventional devices of this type, and which are held securely, either by means of channels on a flatcar or the like, by direct engagement with the walls of a boxcar, or by other suitable fastening means. The impact on the linkage means is taken up by shock absorber means which are suitably resilient, yet are reinforced by the chain structure embedded therein. Where a plurality of linkage means such as chains, cables or the like are used, equalization of the tension and load thereon is achieved by balancing or equalizer means which cooperate with the shock absorber elements in forming part of the linkage means, and yet permit free pivotal adjustment at the outer ends to which the linkage means are attached. Thus the bulkheads are continuously urged into contact with the load therebetween. The restraining device effectively eliminates the costly damage claims which have heretofore been a necessary expense in shipping tin plate, as well as the damage to floors and walls of cars from the use of spikes for wood bracing and dunnage and the application of retarder plates which has been a feature of the methods currently in use. The recurrent expense inherent in such methods is also eliminated, and a reduction in loading time is afforded which provides savings in labor as well as an increased efficiency in loading. The prevention of damage to material afforded by this invention is, further, of great advantage to the consignee as well as to the railroads and the shipper.

Although I have herein set forth and described my invention with respect to certain specific principles and details, it will be understood by those skilled in the art that these may be altered without departing from the spirit and scope of the invention as set forth in the hereunto appended claims.

I claim as my invention:

1. A load restraining device for use in a railroad freight car or the like, comprising a pair of parallel, spaced and oppositely disposed bulkheads for engaging opposite ends of a load supporting pallet on the floor of a freight car, a pair of vertically spaced linkage elements extending at least partially in back of said bulkheads from each side thereof, an equalizer plate pivotally connected to each of said linkage elements, the connections of said linkage elements to said plates therefor being near the ends of said plates, shock absorber means connected to each of said equalizer plates and to said bulkheads intermediately of the connections between the linkage elements and the equalizer plate, said equalizer plates preventing disproportionate stress from being exerted on any of said linkage elements and said shock absorber means absorbing sudden tension stresses on said linkage elements, and a means on each side of said bulkheads intermediate the bulkheads secured to said linkage elements extending from said side and to said freight car for securing said linkage elements to the freight car.

2. In a load restraining device for use in a freight car or the like, a pair of bulkheads positionable at opposite ends of a load supporting pallet on the freight car floor and in parallel spaced relation to one another, means for adjusting tension secured to each of said bulkheads on a side thereof further from the other of the bulkheads, a pair of flexible elements spaced from one another and extending at least partially in back of each of said bulkheads from each of the sides of said bulkheads to restrain said bulkheads, means for fastening the pairs of flexible elements on each side of the bulkheads to a corresponding side of the freight car, shock absorbing means secured to opposite sides of each of said means for adjusting tension, and equalizer means for each of said shock absorber means secured to the shock absorber means at a central location on the equalizer means, each of said equalizer means having outer portions engaging a pair of said spaced flexible elements on opposite sides of the connection between the equalizer means and the shock absorber means.

3. In a load restraining device for use on a freight car or the like, a pair of bulkheads positionable on opposite sides of a pallet on the freight car floor and in parallel spaced apart relationship, a flexible element extending at least partially in back of each of said bulkheads from each side of each of the bulkheads for holding the bulkheads in position, an anchoring means on each side of the bulkheads and intermediate the bulkheads for connection to the freight car, a pair of shock absorber elements secured to and extending from each side of each of said anchoring means for connection to the freight car, an equalizer plate for each of said pairs of shock absorber elements, said elements of each of said pairs being secured to the equalizer plate therefor in said spaced apart relation and each of said flexible elements being secured centrally to one of said equalizer plates, the connection between the flexible elements and the equalizer plate being between the connections of the shock absorber means and the equalizer plate, and means on each of said bulkheads secured to the bulkhead and anchoring the flexible elements extending from opposite sides of the bulkheads.

4. In combination with a boxcar, a load restraining device including a pair of bulkheads positionable at opposite ends of a pallet for supporting a load on the floor of the freight car, said bulkheads being spaced apart in parallel relation, a turnbuckle on each of said bulkheads in a central, back portion thereof, a shock absorber secured to each side of each of said turnbuckles, an equalizer plate pivotally secured to each of said shock absorbers at a central portion of said plate, a pair of flexible bulkhead holding elements secured to vertically opposite ends of each of said equalizer plates whereby the equalizer plates equalize the tension on the said flexible elements, said shock absorbers taking up sudden tension loads on said flexible elements, each of said pair of flexible elements extending around the end of the bulkhead adjacent thereto and thence toward the other bulkhead in spaced relation to the opposite pair of flexible elements on the same side of the box car, and means on each side of the box car for fastening the respective pairs of flexible elements to the side walls of the boxcar.

References Cited in the file of this patent

UNITED STATES PATENTS

| | | |
|---|---|---|
| 872,699 | Vandevort | Dec. 3, 1907 |
| 994,822 | Daly | June 13, 1911 |
| 1,273,456 | Campbell | July 23, 1918 |
| 1,632,016 | Woodyard | June 14, 1927 |
| 1,920,917 | Scales | Aug. 1, 1933 |
| 2,020,943 | Hallquist | Nov. 12, 1935 |
| 2,051,381 | Kivlin | Aug. 18, 1936 |
| 2,065,650 | Burke | Dec. 29, 1936 |
| 2,080,627 | Morgan | May 18, 1937 |
| 2,094,407 | Nampa | Sept. 28, 1937 |
| 2,159,848 | Gibbons | May 23, 1939 |
| 2,226,667 | Love | Dec. 31, 1940 |
| 2,494,004 | Rydner et al. | Jan. 10, 1950 |
| 2,570,368 | Moon | Oct. 9, 1951 |
| 2,827,000 | Tobin | Mar. 18, 1958 |